UNITED STATES PATENT OFFICE.

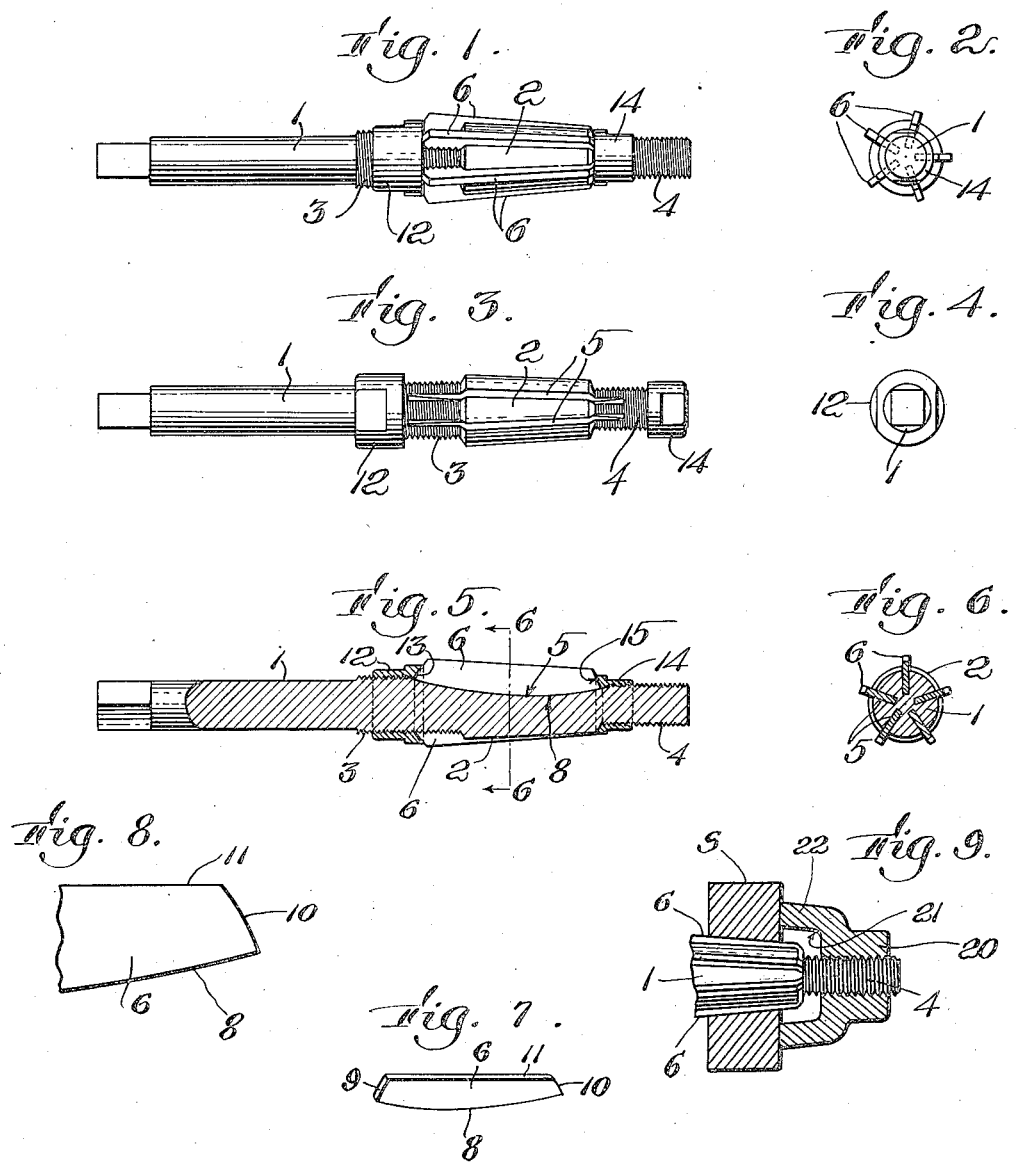

WINFIELD HANCOCK GRAY, OF PORTSMOUTH, NEW HAMPSHIRE, ASSIGNOR TO BEN A. HURD, OF PORTSMOUTH, NEW HAMPSHIRE, AND EDWARD J. GIHON, OF WAKEFIELD, MASSACHUSETTS, AS TRUSTEES.

TOOL ADJUSTABLE IN TAPER.

1,309,571.  Specification of Letters Patent.  Patented July 8, 1919.

Application filed August 2, 1917.  Serial No. 184,036.

*To all whom it may concern:*

Be it known that I, WINFIELD HANCOCK GRAY, a citizen of the United States of America, and resident of Portsmouth, in the county of Rockingham and State of New Hampshire, have invented new and useful Improvements in Tools Adjustable in Taper, of which the following is a specification.

This invention relates to an implement capable of use for reaming tapered holes in metal or for use as a gage or pattern from which to determine the form of a tapered shaft, and its principal object is to provide a tool or implement of this character in which the blades may be adjusted to vary the taper of the implement.

In the accompanying drawings, which illustrate the preferred embodiment of the invention,—

Figure 1 is a side view of the implement;

Fig. 2 is an end view taken from the right of Fig. 1;

Fig. 3 is a side view of the implement with the blades removed;

Fig. 4 is an end view taken from the left of Fig. 3;

Fig. 5 is a longitudinal section taken through one of the grooves with the parts in the position shown in Fig. 1;

Fig. 6 is a cross section on line 6—6 of Fig. 5;

Fig. 7 is a perspective view of one of the blades;

Fig. 8 is an enlarged side elevation of one end of a blade, illustrating the convex end surface; and Fig. 9 is a sectional view of a portion of the implement illustrating its use as an arbor.

The implement may be substantially the same whether it is used as a taper reamer or as a pattern or gage from which to make tapered shafts. It will be understood that if the implement is used for a taper reamer the operative edges of the blades will be suitably sharpened and hardened in the same manner as in cylindrical reamers of this type.

1 represents a spindle having a tapered barrel 2, the spindle being screw-threaded at each end of the barrel as shown at 3 and 4. A series of lengthwise extending grooves 5 of any desired number, five being shown in the drawings, are formed in the barrel and extend throughout the whole length of the barrel from end to end and into the body of the spindle at each end of the barrel as shown.

Seated in the several grooves, which are radially disposed with relation to the axis of the spindle, are blades 6, which are somewhat longer than the barrel 2 so as to project beyond the ends of the barrel in either direction, whereby in the various positions of adjustment of the blades lengthwise of the spindle as hereinafter described, the blade will at all times extend beyond, or at least to the end of, the barrel.

The bottom of each groove against which the inner edge of the blade is seated is so shaped that when the blade is adjusted lengthwise of the spindle with its inner edge bearing on the bottom of the groove the angular relation of the operative edge of the blade to the axis of the spindle will be varied. In the preferred form, the bottom of each groove is curved in the arc of a circle, as best shown in Fig. 5, and the bottom or inner edge of each blade is correspondingly curved on the same arc, as shown at 8, Figs. 5 and 6. Thus, in all positions of the blade as adjusted lengthwise of the groove the inner edge of the blade and the bottom of the groove will maintain a continuous bearing engagement.

The ends of the blades are beveled or inclined as shown at 9 and 10, Fig. 7, while the operative edge of the blade 11 is preferably straight, thus providing a straight tapered implement when the blades are mounted on the spindle. A nut 12 is threaded on to the screw-threaded portion 3 of the spindle, and is made with an under cut face 13 to engage the beveled or inclined ends 9 of the several blades. A similar nut 14, preferably smaller than the nut 12, is threaded on to the screw-threaded portion 4 of the spindle 1 at the forward end of the spindle, which is preferably of smaller diameter than the body 1 of the spindle. The nut 14 is similarly provided with an under cut face to engage the forward inclined or beveled ends 10 of the several blades.

The beveled or inclined ends 9 and 10 of the blades 6 are preferably bowed slightly outwardly about axes respectively passing perpendicularly through the blades thus rendering the ends slightly convex as illustrated in Fig. 8. This permits the ends of the blades to seat solidly against the surfaces 13 and 15 of the screws 12 and 14 in any adjusted position of the blades, whereas if the ends of the blades were flat, they would only seat squarely against the surfaces 13 and 15 in one position of the blades.

When employing my device as an arbor I preferably employ means such as illustrated in Fig. 9 to hold the stock in position on the device, a piece of stock S being shown in operative position on the device by way of example. The particular means illustrated comprises an auxiliary nut 20 threaded on the end 4 of the spindle 1. The auxiliary nut preferably has an annular recess 21 provided at its forward end so as to receive the ends of the blades 6, whereby the forward face of the outer portion 22 of the nut can be advanced beyond the ends of the blades to abut against the stock S.

In operation the blades are mounted in their respective grooves, as shown, and the nuts 12 and 14 are screwed up against the beveled ends of the several blades, thus locking them securely in position in the grooves, the under cut faces 13 and 15, respectively, holding the blades against dislodgment and wedging them firmly to their seats against the bottoms of the grooves. If it is desired to vary the taper of the implement thus assembled, one or the other of the nuts 12 or 14 is unscrewed, thereby loosening the blades, and the opposite nut is screwed up, forcing all the blades simultaneously and equally lengthwise of the spindle. The lengthwise adjustment of the blades bearing on the curved bottom grooves causes the operative edges 11 of the blades to assume changed angular relations to the axis of the spindle, thereby increasing or diminishing the degree of taper of the implement according to the direction in which the blades are shifted. When the blades have been adjusted to the desired position the loosened nut 12 or 14, as the case may be, is again screwed up against the ends of the blades, thereby clamping the blades in adjusted position. Thus, screws 12 and 14 serve the double purpose of adjusting the blades lengthwise of the spindle and of locking them in position after they have been adjusted.

The forward ends of the blades are preferably made slightly narrower measured radially than the rear ends, so as to provide for a somewhat greater degree of taper than if the blades were of uniform width at each end, although the invention is by no means limited to this construction. It will be seen from the foregoing that by adjusting the blades forward in the direction of nut 14, not only can the taper of the implement be reduced, but if desired the blades can be so adjusted as to produce a cylindrical reamer or gage as well as a tapered implement by bringing the operative edges 11 of the blades into parallelism with the axis of the reamer.

While the bottoms of the grooves and also the inner edges of the blades might be of other forms than the arc of a circle, it is an important feature of the invention that these surfaces should be in the arc of a circle so as to afford a continuous firm bearing surface for the blades throughout their whole length in all positions of adjustment lengthwise of the grooves. With any other form than the arc of a circle the adjustment of the blades lengthwise of the grooves would result in their being seated only at separated points, thus lacking the support of continuous contact, which results from making the bottoms of the grooves and the edges 8 of the blades on the arc of the same circle.

It will be understood that when the implement is used as a reamer it will be mounted for rotation in a suitable machine in the usual way.

When used as a gage the blades will be set to the desired taper and the device will be employed in any of the usual or other suitable ways. For example, if a tapered shaft is to be cut to fit into a tapered hole, my improved device is first inserted into the tapered hole in order to set the blades at the proper slope. The device is then mounted in a lathe with the small end directed toward the tail stock and, by mounting a test indicator or pointed tool in the compound tool holder and moving the indicator or tool along the straight edge of one of the blades, the operator may set the compound tool holder so as to obtain the desired taper. If a tapered hole is to be duplicated the operator will first adjust the device to the hole which is to be duplicated, then mount the device in a lathe with the small end directed toward the head stock, and then proceed with the indicator or pointed tool as before except in the reverse direction, thereby obtaining the proper adjustment for the desired internal taper. After the hole is roughed out with a boring tool my device may be employed as a reamer to obtain a perfectly finished hole of the desired taper. If the operator has no model to follow he first sets his compound tool holder to produce the desired taper, then mounts the device in the lathe, and then adjusts the blades to the same slope at which the compound tool holder is set. The hole is then roughed out with a tool in the compound tool holder and accurately finished with the reamer.

When using my improved device as an arbor it is preferably operated as follows: The nut 14 is removed from the end 4 of the spindle 1 and replaced with the auxiliary nut 20 shown in Fig. 9. The auxiliary nut 20 not only locks the stock S in position on the sloping blades 6 but it also functions to hold the blades in position, in lieu of the nut 14, by forcing the blades, through the medium of the stock, against the adjusting nut 12. The auxiliary nut preferably extends the entire length of the threaded end 4 so as to support and reinforce the relatively small end 4.

I claim:

1. A spindle and a series of lengthwise extending blades adjustable longitudinally of the spindle and having such engagement therewith that said longitudinal adjustment will vary the angles of their outer edges to the axis of the spindle, and means for producing such adjustment by pressure on the ends of the blades making a face contact with such ends which is undiminished throughout the range of adjustment.

2. A spindle having a series of longitudinal grooves, a series of blades adjustable in said grooves so as to vary the angles of the outer edges of the blades relatively to the axis of the spindle, and means engaging the ends of the blades along mutually engaging faces for producing such adjustment, at least one of said faces being curved so that the faces firmly engage each other in any angular position of the blades.

3. A spindle having a series of longitudinal grooves, a series of blades adjustable in said grooves so as to vary the angles of the outer edges of the blades relatively to the axis of the spindle, and means engaging the ends of the blades along mutually engaging faces for producing such adjustment, one of said faces being bowed outwardly so that the faces firmly engage each other in various angular positions of the blades.

4. A spindle having a series of lengthwise extending grooves, and a series of blades seated in said grooves and adjustable lengthwise thereof, the bottoms of the grooves being shaped to vary the angular relation of the operative edges of the blades to the axis of the spindle when the blades are adjusted lengthwise of the grooves, said blades having convex ends, and nuts threaded on to said spindle at the ends of said blades having undercut faces adapted to engage the beveled ends of the blades.

5. A spindle having a series of lengthwise extending grooves and a series of blades seated in said grooves and adjustable lengthwise therof, the bottom of each groove being curved in the arc of a circle and the bottom of each blade being correspondingly curved, whereby the adjustment of the blades lengthwise of the grooves will vary the taper of the implement, and a continuous bearing engagement will be maintained between the bottom of each groove and the inner edge of its blade in all positions of adjustment of the blades, said blades having convex ends, and nuts threaded on to said spindle at the ends of said blades having undercut faces adapted to engage the convex ends of the blades.

Signed by me at Portsmouth, New Hampshire, this 23rd day of July, 1917.

WINFIELD HANCOCK GRAY.